INVENTORS
JAMES S. BRYAN
CHARLES F. TEACHER
BY
Robert D. Sanborn
ATTORNEY

INVENTORS
JAMES S. BRYAN
CHARLES F. TEACHER
BY Robert D. Sanborn
ATTORNEY

| | | | | | | | | | | | |
|---|---|---|---|---|---|---|---|---|---|---|---|
| 0 | 0 | 0 | 0 | 0 | 0 | 0 | 0 | 0 | 0 | 0 | 1 |
| 0 | 1 | 0 | 0 | 0 | -1 | -1 | 0 | 0 | 0 | 0 | 0 |
| -3 | -2 | 0 | -1 | 7 | -3 | -3 | 1 | 3 | 3 | 4 | -1 |
| -5 | -3 | 3 | 4 | 5 | 3 | 6 | 5 | 6 | 0 | 7 | -2 |
| -5 | -2 | 10 | 8 | 12 | 10 | 9 | 12 | 8 | 12 | 7 | -3 |
| -1 | -2 | 18 | 13 | 7 | 4 | 5 | 16 | 12 | 12 | 15 | -2 |
| 0 | 2 | 17 | 12 | 1 | -4 | -2 | 16 | 17 | 10 | 10 | 0 |
| 0 | 5 | 14 | 6 | -2 | -7 | 0 | 18 | 14 | 5 | 2 | 0 |
| 0 | 9 | 9 | 0 | -8 | -7 | 3 | 18 | 14 | -1 | -4 | 2 |
| 2 | 8 | -3 | -8 | -9 | -1 | 11 | 18 | 9 | -1 | -4 | 0 |
| 0 | 0 | -4 | -9 | -5 | 7 | 10 | 6 | -2 | -5 | -4 | 0 |
| 0 | -4 | 0 | -6 | 11 | 15 | 4 | -2 | -9 | 4 | -3 | 0 |
| 0 | -4 | 0 | 2 | 21 | 6 | 1 | -5 | -5 | 2 | 3 | 0 |
| 0 | -7 | -2 | 10 | 17 | 5 | -5 | -2 | -3 | 8 | 5 | 0 |
| 0 | -6 | 8 | 23 | 7 | -4 | -1 | -2 | -5 | 9 | 9 | 0 |
| 0 | 1 | 13 | 22 | 11 | 2 | 5 | 4 | 6 | 10 | 9 | 0 |
| -4 | 8 | 12 | 16 | 14 | 10 | 6 | 13 | 15 | 15 | 6 | 0 |
| -5 | 9 | 7 | 14 | 13 | 8 | 12 | 16 | 16 | 20 | 1 | -3 |
| -5 | 2 | 3 | 8 | 3 | 5 | 3 | 4 | 10 | 16 | -6 | 0 |
| -1 | -1 | -2 | 1 | -2 | -3 | -1 | 2 | 4 | 1 | -2 | 0 |
| 0 | 0 | 0 | 0 | 0 | 0 | 0 | 0 | 0 | 0 | 0 | -1 |
| 0 | 0 | 0 | 0 | 0 | 0 | 0 | 0 | 0 | 0 | 0 | -1 |

FIG. 5A.

| | | | | | | | | | | | |
|---|---|---|---|---|---|---|---|---|---|---|---|
| 0 | -1 | 0 | 0 | 0 | 0 | 0 | 0 | 0 | -1 | -1 | 1 |
| 0 | 1 | 0 | 0 | 0 | 0 | 0 | 0 | 0 | 0 | -1 | -1 |
| -2 | -1 | -1 | 0 | 9 | 0 | -3 | -3 | 5 | 5 | 1 | -2 |
| -7 | -4 | 2 | 6 | 4 | 2 | 5 | 2 | 4 | 5 | 3 | -5 |
| -7 | -4 | 8 | 10 | 10 | 8 | 11 | 9 | 4 | 14 | 3 | -7 |
| -3 | -3 | 18 | 10 | 1 | 4 | 8 | 12 | 9 | 12 | 13 | -6 |
| 0 | 3 | 17 | 10 | -4 | -2 | 0 | 14 | 13 | 11 | 8 | -2 |
| 0 | 8 | 19 | 4 | -8 | -4 | 3 | 14 | 13 | 5 | 1 | 0 |
| 0 | 10 | 11 | 1 | -12 | -4 | 7 | 12 | 13 | -2 | -8 | -2 |
| 2 | 9 | -4 | -6 | -8 | -1 | 11 | 14 | 8 | -2 | -7 | 0 |
| 0 | -1 | -8 | -7 | -3 | 8 | 11 | 3 | 0 | -8 | -6 | -2 |
| 0 | -5 | -7 | -6 | 11 | 16 | 4 | 2 | -7 | 3 | -5 | -2 |
| 0 | -5 | -7 | -1 | 21 | 8 | 1 | -5 | -2 | 2 | 0 | -2 |
| 0 | -7 | -7 | 9 | 13 | 6 | -7 | -8 | 0 | 10 | 4 | -2 |
| 0 | -7 | 6 | 19 | 3 | -1 | -3 | -8 | -4 | 11 | 8 | 0 |
| 0 | 3 | 14 | 15 | 8 | 6 | 7 | -3 | 0 | 11 | 9 | -1 |
| -4 | 10 | 11 | 10 | 13 | 10 | 5 | 2 | 9 | 15 | 7 | -2 |
| -8 | 10 | 7 | 10 | 11 | 9 | 10 | 10 | 10 | 16 | 0 | -7 |
| -8 | 1 | 5 | 4 | 1 | 6 | 0 | 0 | 6 | 16 | -9 | -6 |
| -4 | -2 | 1 | 3 | -1 | -2 | 1 | 3 | 1 | 0 | -3 | -2 |
| 0 | 0 | 0 | 0 | 0 | 0 | 0 | 0 | 0 | -1 | 0 | 0 |
| 0 | -2 | 0 | 0 | 0 | 0 | 0 | 0 | 0 | 0 | -2 | -1 |

FIG. 5B.

| WT | R $\times 10^3$ |
|---|---|
| 1 | 270 |
| 2 | 120 |
| 3 | 82 |
| 4 | 68 |
| 5 | 56 |
| 6 | 47 |
| 7-9 | 33 |
| 10, 11 | 27 |
| 12, 13 | 22 |
| 14, 15 | 18 |
| 16-18 | 16 |
| 19-21 | 13 |
| 22, 23 | 12 |

FIG. 5C.

INVENTORS
JAMES S. BRYAN
CHARLES F. TEACHER
BY
Robert D. Sanborn
ATTORNEY

INVENTORS
JAMES S. BRYAN
CHARLES F. TEACHER
BY
Robert D. Sanborn
ATTORNEY

United States Patent Office 3,167,745
Patented Jan. 26, 1965

3,167,745
CHARACTER IDENTIFICATION SYSTEM EMPLOYING PLURAL RESISTOR-CORRELATION MASKS

James S. Bryan, Hatboro, and Charles F. Teacher, Philadelphia, Pa., assignors to Philco Corporation, Philadelphia, Pa., a corporation of Delaware Filed Jan. 15, 1962, Ser. No. 166,082
7 Claims. (Cl. 340—146.3)

The present invention relates to character recognition systems and more particularly to resistor-correlation mask recognition devices employed in such systems.

Systems are known for scanning characters to obtain a signal having an amplitude versus time variation which is characteristic of the shape of the scanned character. For example, the character may be recorded in magnetic ink on a nonmagnetic background and/or the character may be recorded in a color or shade that contrasts with the background. The area containing the character is scanned optically or with an appropriate magnetic sensing means to generate the signal characteristic of the character. Since the novelty of the present invention does not reside in the character scanning means per se it will be assumed in the following description that the characters are recorded in black on a white background. However it is to be understood that the invention is not to be limited to this form of character recording or to the specific scanning system which is shown by way of illustration.

In the presently preferred forms of pattern recognition systems, to which the present invention relates, the signal derived from scanning the character is converted to a series of pulses which have one valve if the area scanned during a given time increment includes any portion of the character, i.e. any "black" area, and a different value if the area scanned does not contain any portion of the character. Means such as a stepping shift register and a tapped delay line are employed to supply selected ones of these pulses in different combinations to the several units of a plurality of weighted resistor adder networks which are known in the character recognition art as resistor-correlation masks. In prior art systems one such mask is provided for each character to be recognized. In the systems of the prior art the polarity of the signal supplied to the mask and the valves of the resistors making up the masks are so selected the the output of the adder network or mask has a maximum of one polarity when the area scanned includes the character associated with that mask.

One of the major disadvantages of masks of this type is that, if a heavy weight is given to any part of the mask to distinguish between two similar characters, for example, if in the mask for R the portion of the slant leg is given relatively heavy weight so as to distinguish between R and P, the weighting of the remainder of the mask becomes less significant. As a result the mask may be incapable of distinguishing between other pairs of characters such as R and K or P and F. If heavy weight is not given to that part it may be impossible to differentiate between R and P.

It is an object of the present invention to provide an improved resistor-correlation mask system which is capable of more precise character differentiation than systems of the prior art.

It is a further object to provide a resistor-correlation mask system which does not require disproportionate weighting of any portion of the mask.

A further object of the present invention is to provide an improved resistor mask system in which a plurality of distinctive areas of a character may be given equal and controlling weight.

In general these and other objects of the invention, are achieved by providing a plurality of masks for at least some of the characters to be recognized and fruther providing means for combining the output of the several masks associated with a given character so that an output or recognition signal is produced only in response to the simultaneous generation of a recognition signal by all masks associated with a given character. For a better understanding of the present invention together with other and further objects thereof, reference should now be made to the following detailed description which is to be read in conjunction with the accompanying drawings in which FIG. 1 is a block diagram of a typical character recognition system employing resistor-correlation masks;

FIGS. 5A–5C are tables showing typical values and typical connections for a multi-level resistor-correlation mask;

FIGS. 8A through 8G are pictorial diagrams which are illustrative of the operation of the system of FIG. 1.

Figures 1, 2, 3:
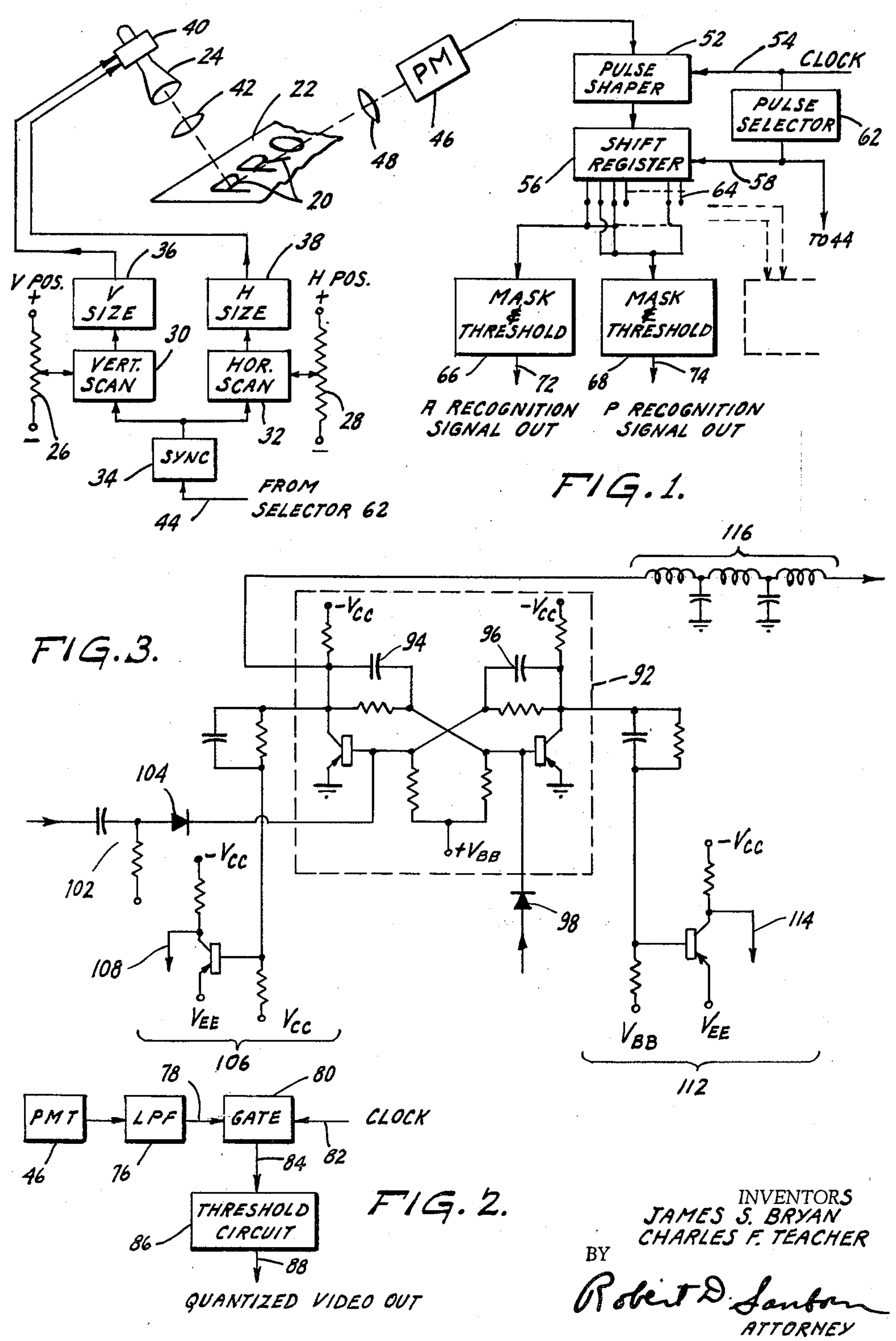
FIG. 2 is a more detailed block diagram of the pulse shaper shown in FIG. 1.
FIG. 3 is a circuit diagram of a portion of the shift register shown in FIG. 1.

In the system shown in FIG. 1, the characters to be recognized are assumed to be non-reflective characters 20 appearing on a white or reflective sheet 22. Sheet 22 may be a letter, envelope, book page, etc. Cathode ray tube 24 forms the output of a flying spot scanner system which also includes vertical position control 26, horizontal position control 28, vertical scan generator 30, horizontal scan generator 32, scan synchronizing means 34, vertical size control 36 and horizontal size control 38. The outputs of vertical scan generator 30 and horizontal scan generator 32 are supplied to the deflection yoke 40 of cathode ray tube 24. A lens 42 is provided for focusing the spot generated by cathode ray tube 24 onto sheet 22, that is, lens 42 images the screen of tube 24 onto sheet 22. As will be explained in more detail presently, the flying spot scanning system just described scans an area of sheet 22 with a rectangular raster, the size of the raster on sheet 22 being slightly larger than one of the characters 20. The area scanned by the raster may be selected by adjusting vertical position control 26 and horizontal position control 28 to cause the raster to coincide with any selected character on sheet 22. The scanning of the raster is controlled by pulses supplied at input 44 to synchronizing circuit 34.

The area of the sheet 22 illuminated by the raster supplied by tube 24 is imaged onto the photosensitive surface of photo-multiplier tube 46 by means of a lens 48. Lens 48 may image the entire sheet 22 onto the photosensitive surface of photomultiplier tube 46. However, only the area illuminated by the raster is effective in producing a signal at the output of photomultiplier tube 46.

The output of photomultiplier 46 is supplied to a pulse shaper 52 which receives a second input from a clock pulse source represented by the arrow 54. Pulse shaper 52 may be any circuit which will convert the time varying signal supplied by photomultiplier 46 to a pulse signal having one amplitude if the area scanned during one clock pulse interval is entirely white and a different value if the area scanned includes a portion of the character which is scanned. One of the two values may be zero. A block diagram of a typical pulse shaping circuit is shown in FIGURE 2.

The output of pulse shaper circuit 52 is supplied to the input of shift register 56. Shift register 56 may be a conventional serial-type shift register in which the data in the register are shifted one place or one stage for each pulse received at input 58. Clock pulses from input 54 are supplied to input 58 by way of a pulse selector circuit 62. Pulse selector circuit 62 may be a counter circuit which cyclically passes the first *n* pulses of a group of *m* pulses and then blocks the remaining *m*—*n* pulses. For example, pulse selector circuit 62 may pass the first 22 pulses of each group of 24 clock pulses supplied by input 54 and then block the remaining two pulses of the group. However in order to simplify the explanation of the invention shown in FIG. 8 it is assumed that pulse selector 62 passes the first 10 pulses of each group of 12 pulses. The output of pulse selector 62 is also connected to the input 44 of synchronizing circuit 34. As will be explained in more detail presently, the time interval represented by the two blocked clock pulses is employed for the flyback time of the flying spot scanner.

In general, shift register 56 is provided with two complementary outputs for each stage of the register. Typically, one output will be at ground potential when the other output is at a selected negative potential. However, in the interest of economy it may be desirable to omit the one or both of the outputs of certain of the stages representing less significant areas of the raster. The outputs of the shift register are shown generally at 64. One typical character recognizing circuit which has been constructed embodying the present invention employs a 264 bit shift register. Such a shift register would have up to 264 pairs of output connections corresponding to connection 64.

Blocks 66 and 68 in FIGURE 1 are individual character recognition circuits. Each of these circuits includes a resistor-correlation mask and a threshold circuit associated with a selected character to be recognized. For the purpose of this description it is assumed that block 66 is associated with or "recognizes" the character A, while block 68 corresponds to or "recognizes" the character P. While only two individual recognition circuits 66 and 68 have been shown in FIG. 1, it is to be understood that one such individual recognition circuit will be provided for each character that is to be recognized by the system. Therefore in a typical system there may be anywhere from 10 to more than 100 such recognition circuits.

While it lies within the scope of the present invention to connect each of the outputs 64 of shift register 56 to each of the individual recognition circuits 66, 68, etc., it has been found in practice that satisfactory recognition of characters may be achieved if less than all, for example 100, outputs 64 are connected to each of the recognition circuits 66, 68, etc. Recognition circuit 66 is provided with a single output connection 72 which is energized if the character A is recognized and is otherwise unenergized. Similarly recognition circuit 68 is provided with a single output connection 74 which is energized if the character P is recognized.

FIGURE 2 shows in more detail a pulse shaper circuit which may be employed as pulse shaper 52 of FIG. 1. In the circuit of FIGURE 2 the signal from photomultiplier tube 46 is supplied by way of low-pass filter 76 to one input 78 of gate circuit 80. Clock pulses are supplied to a second input 82 of gate circuit 80. The clock pulses are preferably regularly spaced rectangular pulses having a duty cycle of the order of .25. The signal appearing at the output 84 of gate circuit 80 will be a series of regularly recurring pulses of variable amplitude, the period of the pulses being determined by the period of the signals supplied at input 82 and the amplitude of the pulses being determined by the instantaneous amplitude of the signals supplied at input 78. A threshold circuit 86, which may be an appropriately biased single-shot multivibrator circuit, converts the multilevel pulses appearing at output 84 to a two level signal appearing at output 88 of threshold circuit 86. That is, if a pulse present on output 84 does not exceed the threshold of circuit 86, then no pulse appears at output 88. If the pulse on output 84 exceeds the threshold level of circuit 86, a pulse of fixed amplitude will appear at output 88. The threshold circuit 86 prevents noise impulses and minute opaque areas from generating an output signal.

FIGURE 3 is a circuit diagram of one stage of the shift register 56 of FIGURE 1. All of the stages of the shift register may be identical. It will be recognized that the portion of the circuit of FIGURE 3 enclosed within broken line 92 is a conventional bi-stable or "flip-flop" circuit which is provided with compensating capacitors 94 and 96 to speed the transition from one state to the other. The shift pulse is supplied to the right-hand side of flip-flop 92 by way of isolating diode 98. A signal supplied by way of diode 98 sets the flip-flop 92 to the "one" or "white" state. A signal from the previous stage is supplied to the left-hand side of flip-flop 92 by way of R.-C. coupling network 102 and diode 104. A signal supplied by way of coupling circuit 102 will set the flip-flop 92 to the "zero" or "black" state. The circuit encompassed by bracket 106 comprises a buffer amplifier stage which provides a negative signal on output connection 108 if flip-flop 92 is set to the "black" state and a signal having a more positive value on output lead 108 if the flip-flop is set to the "white" state. Similarly the circuit encompassed by bracket 112 is a buffer amplifier which provides at output 114 signals equal in amplitude but opposite in sense to the signals supplied on output 108.

A delay line 116 couples the left-hand side of flip-flop 92 to the corresponding side of the following stage. Delay 116 has a delay time sufficient to permit each of the flip-flops to reach a steady state in response to the shift pulse supplied by way of diode 98. Typically delay line 116 may have a delay time of the order of one-half a clock pulse interval.

Figure 4:
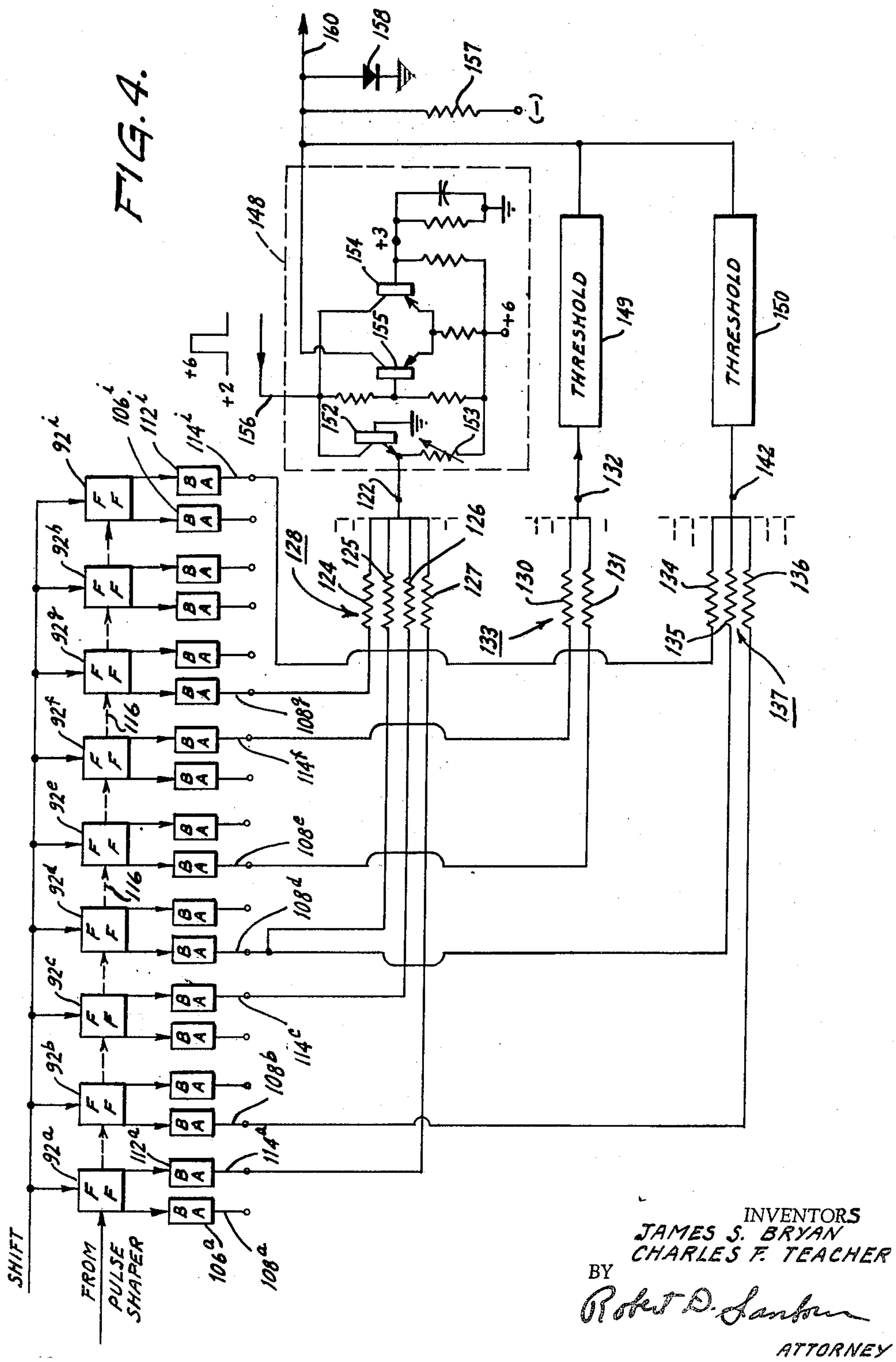
FIG. 4 is a circuit diagram partially in block form of the multi-step mask system which comprises the present invention.

FIGURE 4 shows in detail the novel individual character recognition circuit which comprises the present invention. In FIGURE 4 each of the blocks **92*a*–92*i* may correspond to the circuit 92 of FIGURE 3. The delay means 116 which interconnect successive flip-flops are shown schematically in FIGURE 4 by the broken arrows between successive flip-flop stages. Blocks 106*a* through 106*i* each correspond to the circuit 106 of FIGURE 3. Similarly blocks 112*a* to 112*i* correspond to the circuit 112 of FIGURE 3. Selected ones of the outputs 108*a* to 108*i* and 114*a* to 114*i* are connected to one common lead 122 by way of resistors 124–127 which together form a resistor-correlation mask 128. While four resistors are shown it is to be understood that in practice many more resistors, for example sixty to one hundred resistors, may be connected to the one common output lead 122. In general the resistors 124–127** will have different values empirically determined from the characteristics of the characters to be recognized.

Resistors 130 and 131 which have one terminal connected to a common point 132 and opposite terminals connected to output leads **114*f* and 108*e* respectively schematically represent a second resistor mask 133 similar in construction to mask 128. The second mask may have a different number of resistors and in general will have different values of resistance and/or different points of connection to the shift register than the first mask. A third mask 137 of similar construction is represented by resistors 134–136 which have input terminals connected to output connections 108***b*, 108*d* and 114*i*. This third mask 137 has a common output terminal 142. The connections of the three masks 128, 133 and 137 to the outputs of the buffer amplifiers 106 and 112 has been chosen at random merely to illustrate that the resistors of the different masks may be connected to different ones of the outputs of these buffer amplifiers 106 and 112. Therefore the connection shown in FIG. 4 does not necessarily represent the connections which would be employed for a particular character. However FIGS. 5A–5C are tables showing typical connections and resistor values for a mask which will recognize the letter *z* when intermixed with the letters *a, c, e, i, m, n, o, r, s, u, v, w* and *x*.

Blocks 148, 149 and 150 represent three similar threshold circuits which are coupled to terminals 122, 132 and 142, respectively. The input connection of circuit 148 is connected directly to the emitter of grounded-base NPN transistor 152. Variable resistor 153 between the input connection and a point of positive potential provides the threshold level adjustment for the circuit 148. The collector of transistor 152 is connected to the collector of transistor 154 which, together with transistor 155, forms a keyed trigger circuit. Strobe or keying pulses are supplied by way of connection 156 from pulse selector 62 or some similar source.

The outputs of all three circuits 148, 149 and 150 are connected to a first terminal of combining resistor 157. The other terminal of resistor 157 is connected to a point of negative potential. The first terminal of resistor 157, which is also the output connection 160 of the mask, is connected to ground by way of diode 158.

Character recognition systems heretofore know have employed a single mask such as any one of the masks 128, 133 or 137 which is directly connected to a threshold circuit such as circuit 148. However we have discovered that unexpected improvements in the operation of the system are obtained if one or more additional masks, each with its individual threshold circuit, are employed and the outputs of all masks combined in a coincidence circuit or "and" gate. However if any character to be recognized is appreciably different from all other characters of the group, the individual character recognition circuit for that character may take the form of the prior art circuit. The character recognition circuit of FIG. 4 is compatible with i.e. produces the same type output signal as, the character recognition systems of the prior art.

The operation of the system of FIGURES 1 and 4 will now be described with reference to FIGURES 6, 7 and 8. To scan a selected character 20, for example the first letter P shown in FIGURE 1, the vertical position control 26 and horizontal position control 28 of the flying spot scanner tube 24 are adjusted to position one corner of the raster produced by vertical scanning circuits 30 and 32 at a point corersponding to point 162 in FIGURE 6. The vertical size control 36 and horizontal size control 38 are set so that the raster completely covers the area in which the character is located. In general this area will be somewhat larger than the circumscribed rectangle of the character in order to accommodate the horizontal and vertical mis-positioning of the character which may be encountered in practice. The means for establishing the horizontal and vertical position of the raster and the horizontal and vertical size of the raster form no part of the present invention and hence will not be described in detail. However it should be understood that in most instances these operations will be performed automatically by means (not shown) responsive to the signals supplied by photomultiplier tube 46.

Figures 6, 8:
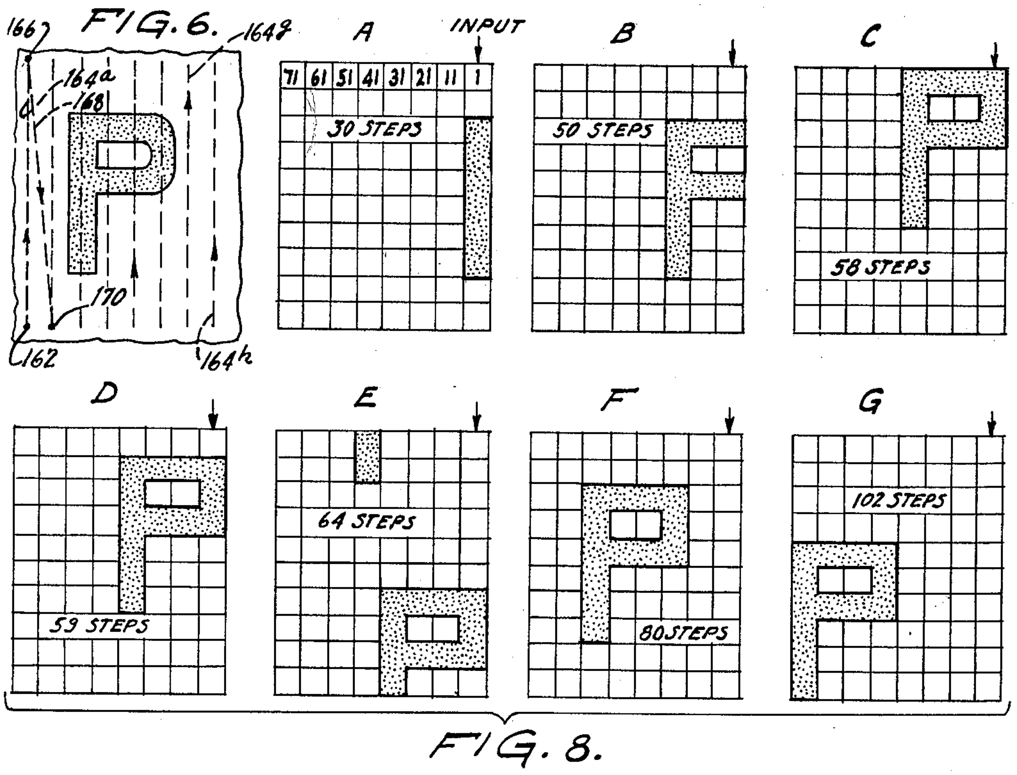
FIG. 6 is a pictorial view showing a typical scanning raster for the system of FIG. 1.
Figure 7:
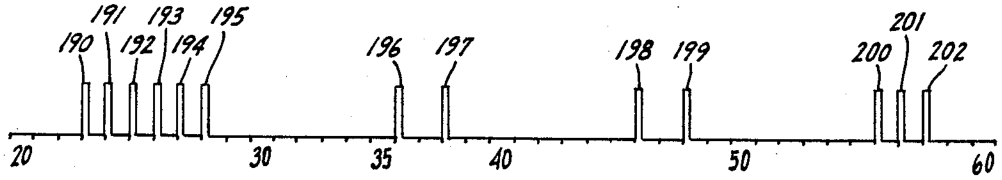
FIG. 7 is a plot showing the signal generated by the scanning portion of the system of FIG. 1 for a particular character.

In the example chosen for illustration in FIGURES 6–8 a raster is employed in which vertical scan generator 30 provides a signal to deflection yoke 40 which will scan the spot along the path 164*a* in FIGURE 6 to a point 166 which is at or beyond the limit of the character. The scan along path 164*a* preferably is accomplished in a series of discrete steps. Thus vertical scan generator 30 may comprise a digital stepping counter responsive to the pulse signals supplied at input 44 and a digital-to-analog converter circuit which converts the digital output of the counter to a suitable deflection voltage. In the example chosen for illumination in FIGURE 8, it will be assumed that the scan from point 162 to point 166 is completed in ten clock pulse intervals. It will be further assumed that two clock pulse intervals are allowed for the retrace of the scan along path 168. Horizontal scanning generator 32 preferably provides a step voltage which increases in equal increments in the clock pulse intervals allowed for vertical retrace. One increment of the horizontal scan signal will step the position of the spot from point 162 to point 170 in FIGURE 6. In the example chosen for illustration it will be assumed that horizontal scan generator 32 provides eight such steps in each cycle. Therefore the vertical scan 164*a* will be repeated at the positions represented by the broken lines 164*a* to 164*h* in FIGURE 6. While it is usually preferable to employ regularly spaced clock pulses, it is to be understood that the circuits of FIG. 1 respond to the actual occurrence of a clock pulse without regard to the timing of the pulse. Hence any variations in the spacing of the clock pulses will not affect the operation of the circuit. The table given in FIG. 5 is for a system of this type in which the sweep is completed in the first 22 of each group of 24 clock pulses and the horizontal scan is completed in 12 steps.

FIGURE 7 is a plot of a portion of the signal supplied by pulse shaper 52 as a function of the number of shift pulses applied to register 56. As will be seen from FIGURE 6, no signal is generated by pulse shaper 52 for the first twenty-two scan steps since during this time the spot is scanning a white area of sheet 22. During scan steps 23–28 the beam is scanning areas containing portions of the character P and hence pulses 190–195 are generated. Similarly pulses 196–202 will be generated during the 36th, 38th, 46th, 48th and 56th–58th scan intervals respectively.

As will be seen from FIG. 4, the operation of the resistor-correlation masks 128, 133 and 137 is entirely electrical in nature and hence does not depend on the physical positioning of shift register stages 92*a*–92*i*. However, the operation of the circuit of FIG. 4 may be understood more readily if it is assumed that the register is made up of eight groups of ten stages each, corresponding to the eight scans of ten intervals each, and that these stages are arranged side by side with stages 11 adjacent stage 1 as shown in FIGURE 8*a*. It is to be understood that while stage 11 is positioned adjacent stage 1 it receives its input signal from stage 10 at the bottom of the first column. Similarly stage 21 is positioned adjacent stage 11 but receives its signal from the 20th stage at the bottom of the second column.

The shifting pulse, which is supplied to all of the stages of the shift register 56 simultaneously, normally sets these stages to register "white" information. Therefore there will be no change in the condition of the shift register 56 during the first twenty-two shift pulses supplied thereto from pulse selector 62. During the 23rd shift pulse interval the pulse 190 of FIGURE 7 will reset the first stage of shift register 56, that is, stage 92*a* of FIGURE 4, to represent "black" information. Comparing FIGURE 7 with FIGURE 8*a* it will be seen that at the end of thirty shift pulses the information represented by pulses 190–195 will be stored in the third through the eighth stages in the series. In FIGURE 8*a* these stages are shaded to indicate that they are storing "black" information whereas the remainder of the stages of the shift register are storing "white" information. At the end of the 31st shift pulse the information represented by pulses 190–195 will be stored in the fourth through the ninth stage, that is, it will move one space for each shift pulse.

After fifty shift pulses have been applied to register 56 the information formerly contained in the third through the eighth stages is now contained in the 23rd through the 28th stages and the information represented by pulses 196 and 197 is stored in the 13th and 15th stages respectively. Similarly the information represented of pulses 198 and 199 is stored in the third and fifth stages, respectively.

At the end of 58 shift pulses "black" information will be stored in the 1st–3rd, 11th, 13th, 21st, 23rd, 31st–36th stages of shift register 56. In the matrix array of FIGURE 8 the stages storing the black information reproduces in block form the P of FIGURE 6. In response to the 59th shift pulse the information contained in each of the stages just mentioned will again advance to the next higher numbered stage. In the matrix array of stages shown in FIGURE 8 this will have the effect of moving the block letter P down one space as shown in FIGURE 8D. FIGS. 8E and 8F represent the position of the information in the shift register 56 after the 64th shift pulses and the 80th shift pulses, respectively. It will be seen from FIGURE 8F that after the 80th shift pulse the information is centered in the shift register 56. As shown in FIG. 8G, at the end of 102 shift pulses, pulse 190 which represents the lowest portion of the upright stroke of the letter P occupies the last stage of shift register 56. Between the 58th shift pulse and the 102nd shift pulse the letter P will have assumed every possible position within shift register 56.

Figure 9:
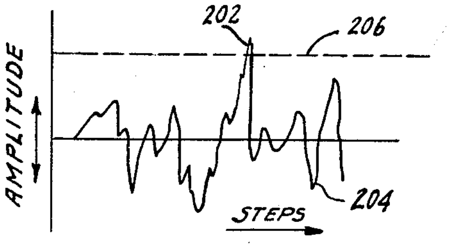
FIG. 9 is a plot showing a typical waveform generated by one of the correlation masks of FIG. 4.

FIGURE 9 is a plot which is representative of the current variations at common junction 122 of FIG. 4, for example. The points of connection and the resistor values of the mask are selected so that the peak 202 in waveform 204 occurs at the time that a signal representing a normally positioned character is centered in the register. As shown above, this should occur on the 80th shift pulse for the example shown in FIGURES 6–8. Broken line 206 represents the threshold level of the circuit to which the common junction is connected, in this example transistor 148. Characters in the group to be rejected by the mask will produce an undulating current similar in form to waveform 204 except that the current does not have a peak which will exceed level 206 in the vicinity of the 80th step or shift pulse. The masks 133 and 134 are selected so that when the character to be recognized is scanned, they also produce a current wave having a peak at or about the 80th step.

If the output of mask 128 is below level 206 the emitter of transistor 152, and hence the emitter of transistor 154, will be held at a potential which is less than the potential of the base of transistor 154. Thus transistor 154 will be held off and transistor 155 will be held on. If the output of the mask exceeds level 206, the strobe pulse on input 156 is permitted to raise the emitter of transistor 154 to the point where this transistor conducts and transistor 155 is turned off. Transistor 154 will continue to conduct until the potential of input lead 156 falls to a potential below that of the base of transistor 154.

If transistor 155 and/or either one of its counterparts in circuits 149 and 150 is conducting output 160 will be held at ground potential by conduction through diode 158. However if the threshold is exceeded in all three circuits 148, 149 and 150 there will be no conducting transistor connected to diode 158; hence output terminal 160 will be permitted to go negative and thus generate a recognition signal.

In the system of FIGURE 4, unlike the systems of the prior art, it is not necessary that each mask 128, 133 or 137 respond only to a single character in a given group of characters or to a given feature or given group of features. The points of connection and resistance values of each mask are so selected that each mask will provide an output signal which exceeds threshold level 206 in the vicinity of the 80th shift pulse if any one of a certain subgroup of characters is scanned and no output signal which exceeds the threshold level in the vicinity of the 80th shift pulse if the remaining characters of the group are scanned. In a triple mask, one or more of the characters recognized by the first mask may be recognized also by the second mask. Also the second mask may recognize, i.e. provide an output signal above the predetermined level, for one or more of the characters rejected by the first mask. Similarly the third mask may recognize one or more of the characters recognized by the first mask and one or more of the characters recognized by the second mask. The only limitation placed on the masks is that only one character is recognized simultaneously by all three masks.

Turning once again to the example of FIGS. 5A–5C the mask represented by FIG. 5A will provide an output signal which exceeds the output level if the letter *z* is scanned and may also provide an output signal exceeding the threshold level in response to one or more of the following letters *w*, *e*, *r*, *u*, *o*, *a*, *x*, *c*, *v* and *n* but will not produce a signal exceeding the threshold level for any other small lower case letter. The mask represented by FIG. 5B will not produce an output signal exceeding the selected threshold level for the letters *a*, *c*, *e*, *n*, *o*, *r*, *u*, *v*, *w* and *x* but will produce an output signal exceeding the threshold level in response to the scanning of *z* and possibly *s* and *m*. However only the letter *z* will cause both of the masks to exceed the threshold level.

In the tables of FIGS. 5A and 5B the positive numerals indicate a resistor connected to the "black" output of that stage while the negative numerals indicate a resistor connected to the "white" output of that stage. The magnitude of each numeral is proportional to the magnitude of the current to be supplied by that stage to the common junction and is approximately inversely proportional to the resistance of the resistor connected to that stage. It has been found in practice that it is not necessary to maintain the exact current ratios given in FIGS. 5A and 5B. FIG. 5C is a table showing the standard commercial resistor values in thousands of ohms which will approximate the current ratios indicated in FIGS. 5A and 5B. The numeral zero in FIGS. 5A and 5B indicate that no connection is made to that stage for that particular mask.

Since each mask performs the same type of function as all other masks the design considerations for one mask are the same as for all masks. The final selection of the points of connection and resistance values for each mask is best determined empirically by trial and error. The final selection of the parameters of the mask can be expedited if a tentative mask is selected which will reject a selected small group of interfering characters. The tentative mask may then be altered by trial and error to maximize the differences in the response to a given character and the selected interference characters. The improved mask is then compared with all characters of the group to be scanned. Any large scale general purpose digital computer can be programmed to make the necessary comparison between the response of the mask to various scanned characters and to evaluate the effect of changing one or more parameters of a given mask. In general it will be found that the improved mask will reject both the selected small group of characters employed in the tentative design and other characters as well. A mask for the second path may then be selected in a similar fashion which will recognize the selected character and reject a selected group of the characters recognized by the first mask. If more than one character is recognized both by the first mask and by the second mask, a third mask may be selected which will differentiate between the characters to be recognized and the restricted group of characters recognized by the other two masks.

Obviously the invention is not limited to a system which employs three masks per character. It lies within the scope of the invention to employ only two masks or more than three masks.

While there has been described what is at present considered to be the preferred embodiment of the invention it will be apparent that various modifications and other embodiments thereof will occur to those skilled in the art within the scope of the invention. Accordingly we desire the scope of the invention to be limited only by the appended claims.

We claim:

1. In a character recognition system which includes means for scanning an area which includes a character to be recognized, said scanning means including means for generating time spaced signals representative of the character scanned, a multi-stage shift register, means for setting said shift resister to represent said time spaced signals, means for repeatedly shifting stage by stage the signals stored in said shift register, a plurality of individual character recognition circuits each arranged to provide an output signal in response to the scanning of a different selected character, at least one of said individual character recognition circuits comprising a plurality of resistor-correlation masks, each of said resistor-correlation masks comprising a plurality of resistors, one terminal of each of said resistors of a mask being connected to a common output terminal of that mask, a second terminal of each of said resistors of a mask being connected to an output of a respective one of said stages of said shift register, a coincidence circuit having a plurality of inputs, and means connecting each input of said coincidence circuit to a corresponding one of said common terminals.

2. A system in accordance with claim 1 wherein the values of said resistors and the stages to which said resistors are connected are such that the signal present at each common terminal of said mask has an amplitude level above a preselected level for that mask only in response to settings of said shift register which are representative of a selected group of characters, said group of characters being different for each mask, only one character being common to all said groups of characters.

3. In a character recognition system which includes means for scanning an area which includes a character to be recognized, said scanning means including means for generating time spaced signals representative of the character scanned, a multi-stage shift register, each stage of said shift register being adapted to be set to register character information, each stage of the shift register having first and second complementary outputs, means for setting said shift register to represent said time spaced signals, and means for repeatedly shifting stage by stage the signals stored in said shift register, a plurality of individual character recognition circuits each arranged to provide an output signal in response to the scanning of a different selected character, at least one of said individual character recognition circuits comprising, a plurality of resistor-correlation masks, each of said resistor-correlation masks comprising a plurality of resistors, one terminal of each of said resistors of a mask being connected to a common output terminal of said mask, a second terminal of each of said resistors of a mask being connected to one of said complementary outputs of a respective one of said stages of said shift register, a coincidence circuit having a plurality of inputs, and means connecting each input of said coincidence circuit to a corresponding one of said common terminals.

4. A system in accordance with claim 3 wherein the values of said resistors and the stages to which said resistors are connected are such that the signals present at said common terminals of each mask has an amplitude above a preselected level for that mask only in response to settings of said shift register which are representative of a selected group of characters, said group of characters being different for each mask, only one character being common to all said groups of characters, and wherein said coincidence circuit provides a selected output signal only in response to signals above said selected levels at each of said common terminals.

5. A character recognition system for providing signals at respective output connections in response to the scanning of corresponding characters which said system is capable of recognizing, said system comprising means for scanning an area which includes a character to be recognized, said scanning means including means for generating time spaced signals representative of the character scanned, a plurality of individual character recognition circuits each provided with one of said output connections and each arranged to recognize a different character, at least one of said individual character recognition circuits comprising a plurality of resistor-correlation masks and a coincidence circuit, each of said resistor-correlation masks comprising a plurality of resistors having first and second terminals, the first terminal of each of said resistors of a mask being connected to a common output terminal of said mask, said coincidence circuit having a plurality of inputs, means connecting each input of said coincidence circuit to a corresponding one of said common terminals, and means coupling the output of said coincidence circuit to said output connection of said one character recognition circuit, and coupling means coupling said individual character recognition circuits to said scanning means, said coupling means including means for supplying signals representative of selected ones of said time spaced signals to said second terminals of said resistors of said masks, said last-named means including means for repeatedly changing the selected time spaced signals represented at said second terminals of said masks, each of said masks of an individual character recognition circuit having a different response to the changing, time spaced signals supplied thereto.

6. A character recognition system for providing signals at respective output connections in response to the scanning of corresponding characters which said system is capable of recognizing, said system comprising means for scanning an area which includes a character to be recognized, said scanning means including means for generating timed spaced signals representative of the character scanned, a plurality of character recognition circuits each provided with one of said output connections and each arranged to recognize a different character, at least one of said character recognition circuits comprising a plurality of resistor-correlation masks and a coincidence circuit, each of said resistor-correlation masks comprising a plurality of differently valued resistors each having first and second terminals, the first terminals of each of said resistors of a mask being connected to a common output terminal of said mask, said coincidence circuit having a plurality of inputs, and means connecting each of said inputs of said coincidence circuit to a corresponding one of said common terminals, the output terminal of said coincidence circuit comprising said output terminal of the character recognition circuit in which it is included, and coupling means for coupling said scanning means to the inputs of said character recognition circuits, said coupling means including means for supplying signals representative of selected ones of said time spaced signals to said second terminals of said resistors of said masks, said last-mentioned means supplying signals representative of different groups of time spaced signals to each of said masks, said last-mentioned means including means for repeatedly changing the time spaced signals represented in each of said groups.

7. A character recognition system comprising means for scanning an area in a raster comprising $n$ sweeps of $m$ time intervals each, where $m$ and $n$ are integers greater than one, means associated with said scanning means for generating a signal having a first value for time intervals in which said scan coincides with a character part and a second value for time intervals in which said scan does not coincide with a character part, a plurality of individual character recognition circuits each arranged to recognize a different character, at least one of said individual character recognition circuits comprising a plurality of resistor-correlation masks and a coincidence circuit, each of said resistor-correlation masks comprising a plurality of differential valued resistors, each resistor having a first terminal and a second terminal, the first terminal of each of said resistors of a mask being connected to a common output terminal of said mask, said coincidence circuit having a plurality of inputs, and means connecting each input of said coincidence circuit to a corresponding one of said common terminals, and coupling means coupling said scanning means and said individual character recognition circuits so as to supply signals representative of signals generated in selected time intervals to said second terminals of said resistors in each of said masks, a different group of time intervals being represented at each of said masks, said coupling means including means for repeatedly changing the time intervals represented in each of said groups.

References Cited in the file of this patent

UNITED STATES PATENTS 3,017,625 Evans et al. ------------ Jan. 16, 1962